United States Patent
Tsuyuki et al.

(10) Patent No.: US 6,805,819 B2
(45) Date of Patent: Oct. 19, 2004

(54) METHOD OF MANUFACTURING CONCRETE FORM

(75) Inventors: Eiji Tsuyuki, Tokyo (JP); Koujiyu Matsumoto, Tokyo (JP); Noriaki Tamasaki, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 107 days.

(21) Appl. No.: 10/237,056

(22) Filed: Sep. 9, 2002

(65) Prior Publication Data
US 2003/0062651 A1 Apr. 3, 2003

(30) Foreign Application Priority Data
Sep. 20, 2001 (JP) .................................... 2001-286617

(51) Int. Cl.[7] .......................... B28B 3/04; B29C 33/10; B29C 33/38; B29C 39/28
(52) U.S. Cl. .................. 264/37.19; 264/40.5; 264/161; 264/219; 264/220; 264/225; 264/328.9; 425/401; 425/420; 425/812; 164/15; 164/37; 164/521
(58) Field of Search .............................. 264/40.5, 161, 264/37.19, 328.9, 219, 220, 225; 425/812, 401, 420; 164/15, 37, 521

(56) References Cited

U.S. PATENT DOCUMENTS

| | | | | |
|---|---|---|---|---|
| 3,670,066 A | * | 6/1972 | Valyi | 264/148 |
| 5,057,256 A | * | 10/1991 | Gorin | 264/113 |
| 5,188,791 A | * | 2/1993 | Thiery et al. | 264/226 |
| 5,759,459 A | * | 6/1998 | Eckardt et al. | 264/40.1 |
| 5,881,794 A | * | 3/1999 | Harada et al. | 164/7.1 |
| 6,103,150 A | * | 8/2000 | McDougall | 264/40.4 |
| 6,106,274 A | * | 8/2000 | Ritchie et al. | 425/544 |

FOREIGN PATENT DOCUMENTS

| | | | |
|---|---|---|---|
| JP | 56-5722 A | 1/1981 | |
| JP | 63-296905 A | * 12/1988 | B28B/1/14 |
| JP | 64-1504 A | * 1/1989 | B28B/1/14 |
| JP | 5-104588 A | 4/1993 | |
| JP | 5-318428 A | 12/1993 | |
| JP | 7-132519 A | 5/1995 | |
| JP | 08-52714 A | * 2/1996 | B28B/1/14 |
| JP | 8-309760 A | 11/1996 | |
| JP | 2000-343535 A | 12/2000 | |

OTHER PUBLICATIONS

JPO Abstract of JP–63–296905–A, 1998, Japanese Patent Office.*
JPO Abstract of JP–64–1504–A, 1998, Japanese Patent Office.*
JPO English machine translation of JP–08–52714–A, 2004, Japanese Patent Office website.*

* cited by examiner

Primary Examiner—Michael P. Colaianni
Assistant Examiner—Michael I. Poe
(74) Attorney, Agent, or Firm—Birch, Stewart, Kolasch & Birch, LLP

(57) ABSTRACT

A cylindrical concrete receiver 10 is caused to project from a top section 3 of a body section 11 forming a frame 2. When concrete 5 is filled in the body section 11, part of the concrete 5 is caused to overflow inside the concrete receiver 10 and then, pressure is applied to the concrete 5 overflowed in the concrete receiver 10 by a weight 12.

6 Claims, 3 Drawing Sheets

METHOD OF MANUFACTURING CONCRETE FORM

BACKGROUND OF THE INVENTION

1. Field of the Invention

The present invention relates to a method of manufacturing a concrete form or mold which can be used as an injection mold or the like.

2. Description of the Prior Art

Manufacture a mold or a form using concrete to reduce mold expenses such as injection molding is known. FIG. 2 shows such a conventional mold or form manufacturing method in which a master model 1 is enclosed by a frame 2 and concrete 5 is filled inside the frame 2 through an filling hole 4 provided on a top section 3 of the frame 2. After the concrete 5 hardens, the frame 2 is removed from the concrete 5 to provide a concrete form or mold. Reference numeral 2a is a small vent hole for mold venting.

FIG. 3 shows an example in which such a concrete form or mold is used as an injection mold. This injection mold is provided with a movable mold 6 and a stationary mold 7 and molding resin is filled in a cavity 8 formed by both the movable and stationary molds 6, 7 through an filling hole 7a by an injection machine. The movable mold 6 and the stationary mold 7 are the above-mentioned concrete forms or molds, wherein the movable mold 6 is provided with a mold surface 6a copied from the master model 1 to provide an external appearance surface of a molded article.

In the case of the concrete form or mold, when the concrete is filled into the frame 2, it is not possible to faithfully copy the shape of the master model 1 unless the concrete is fully filled therein. In this case, correction of the concrete form or mold is required after manufactured. This not only requires a great deal of time and labor, but also costs a great deal. It was therefore necessary to establish a method of manufacturing the concrete form or mold which makes it possible to fully fill the concrete in the frame 2.

Further, the concrete form or mold has a peculiar characteristic whereby pinholes can be easily produced on the surface thereof. Inferior outer appearance of the molded article often results from the pinholes generated on the mold surface. As shown in FIG. 3, the pinhole 9 may be formed on the surface of the mold surface 6a facing the cavity 8 parallel to the mold opening direction. If part of the molding resin 13 enters the pinhole 9 during injection molding and hardens there, there is some possibility that the movable mold 6 will not be easily opened. Accordingly, it was also necessary to decrease the generation of the pinholes.

SUMMARY OF THE INVENTION

It is therefore an object of the present invention to realize these demands or requests.

To solve the problems, in one aspect of the present invention, there is provided a method of manufacturing a concrete form or mold by providing a frame on a master model and filling concrete into the frame, which comprises the steps of filling the concrete more than the predetermined cubic volume into the frame and then, forcibly applying pressure to the concrete to the predetermined cubic volume.

A method of manufacturing a concrete form or mold according according to another aspect of the present invention includes a frame which is provided with a body section for receiving concrete of the predetermined cubic volume and a concrete receiver for receiving concrete more than the predetermined cubic volume, the method comprising the steps of causing the concrete to overflow from the body into the concrete receiver and then, forcibly applying pressure to the overflowed concrete received within the concrete receiver in the direction of the inside of the body section.

When the concrete is filled into the frame, the concrete more than the predetermined cubic volume is filled therein and then, the pressure is forcibly applied to the concrete to the predetermined cubic volume. Accordingly, the concrete under pressure can enter the detailed sections of the surface of the master model to faithfully copy the shape of the master model. This can not only reduce a great deal of time for correction of the concrete form or mold after it is manufactured, but also reduce a great deal of cost. Since the concrete can be fully filled into the frame, it is possible to prevent the concrete from being improperly filled into the frame and as a result, durability of the form or mold can also be improved.

The copied surface of the concrete form or mold is made fine and smooth and generation of the pinholes on the mold surface of the concrete form or mold can be reduced by the forcible application of pressure. Accordingly, it is not only possible to reduce inferior external appearance of the mold article resulting from the pinholes, but also to make the form or mold opening smooth during injection molding.

The body section of the frame is provided with the concrete receiver, and when the concrete is filled into the frame, the concrete is caused to overflow in the concrete receiver so that it can be filled beyond the predetermined cubic volume. Then, forcible pressure is applied to the concrete overflowed within the concrete receiver to make the final filling quantity of the concrete within the body section to be the predetermined cubic volume. It is therefore possible to efficiently perform the forcible application of pressure to the concrete.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
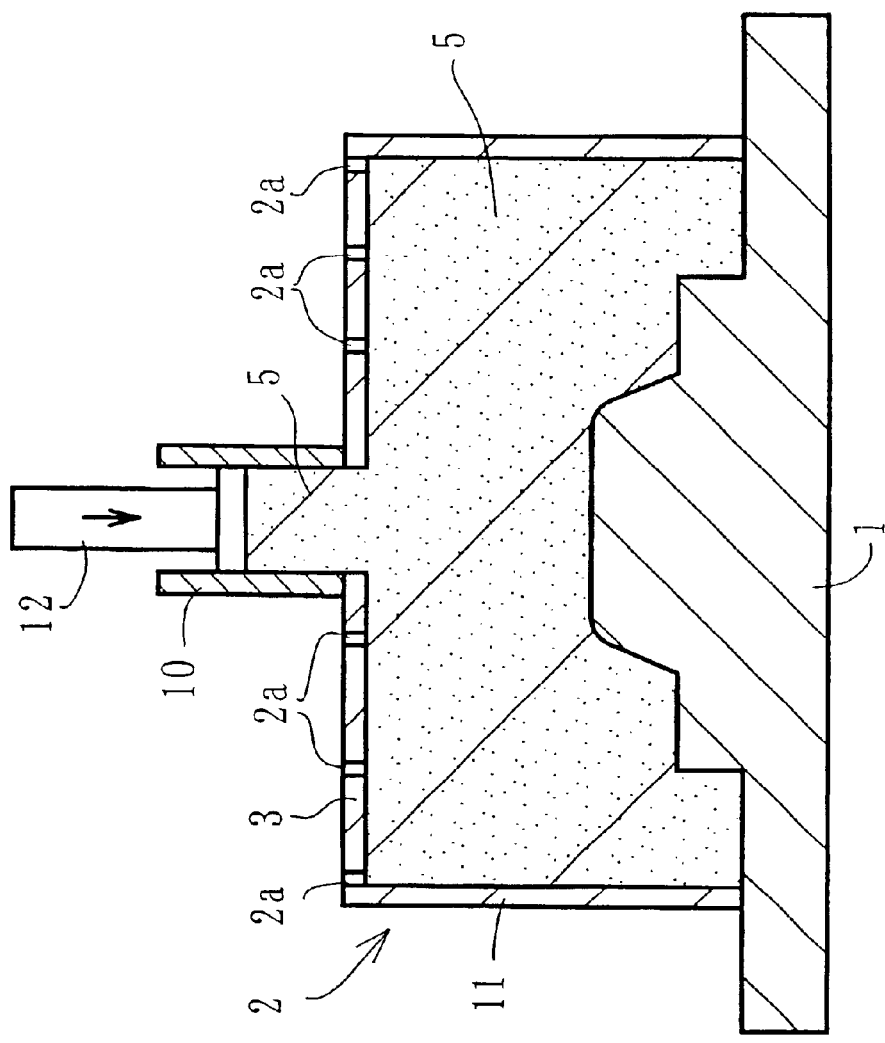
FIG. 1 is a view showing a manufacturing method according to an embodiment of the present invention.
Figure 2:
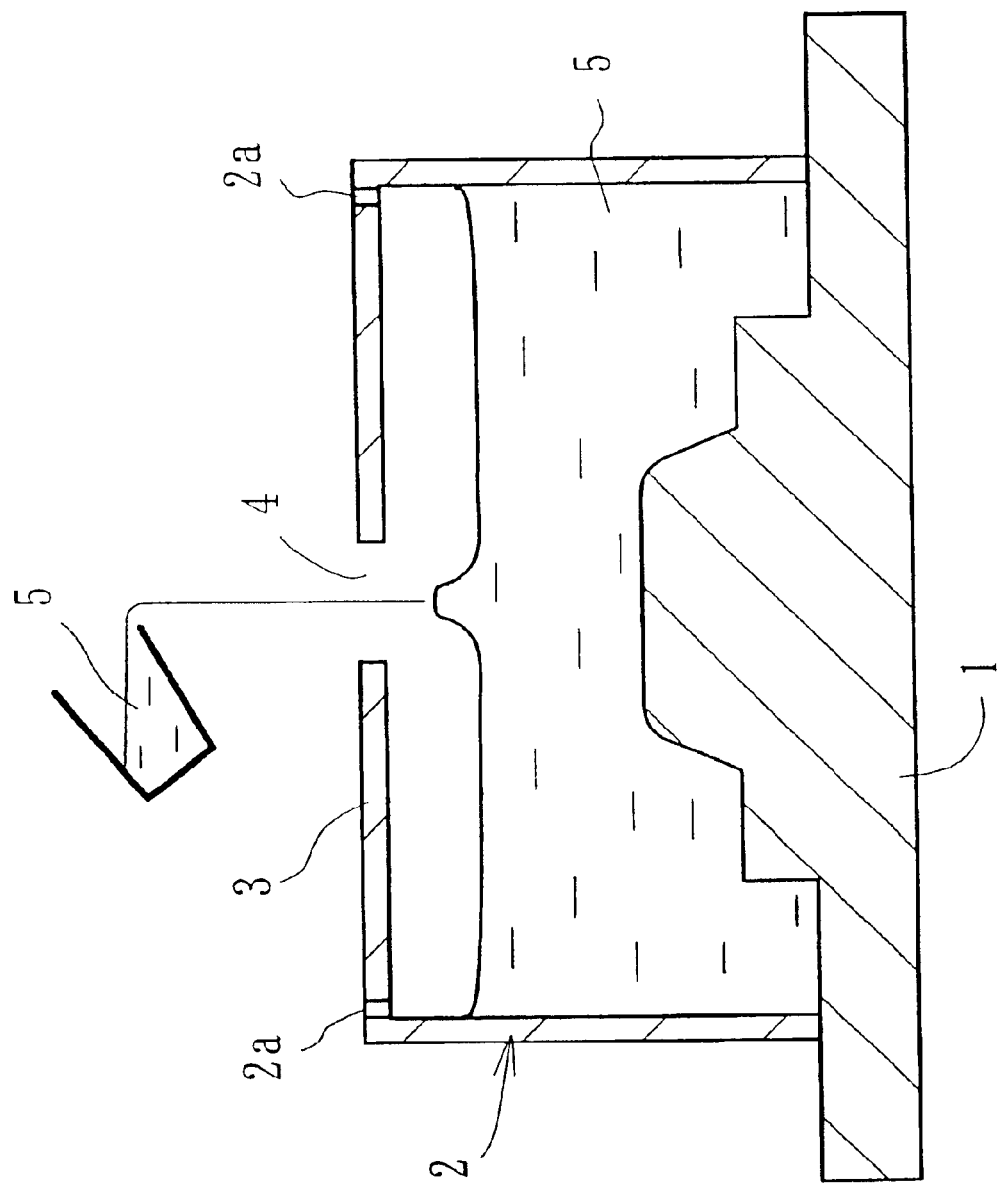
FIG. 2 is a view showing a conventional manufacturing method.
Figure 3:
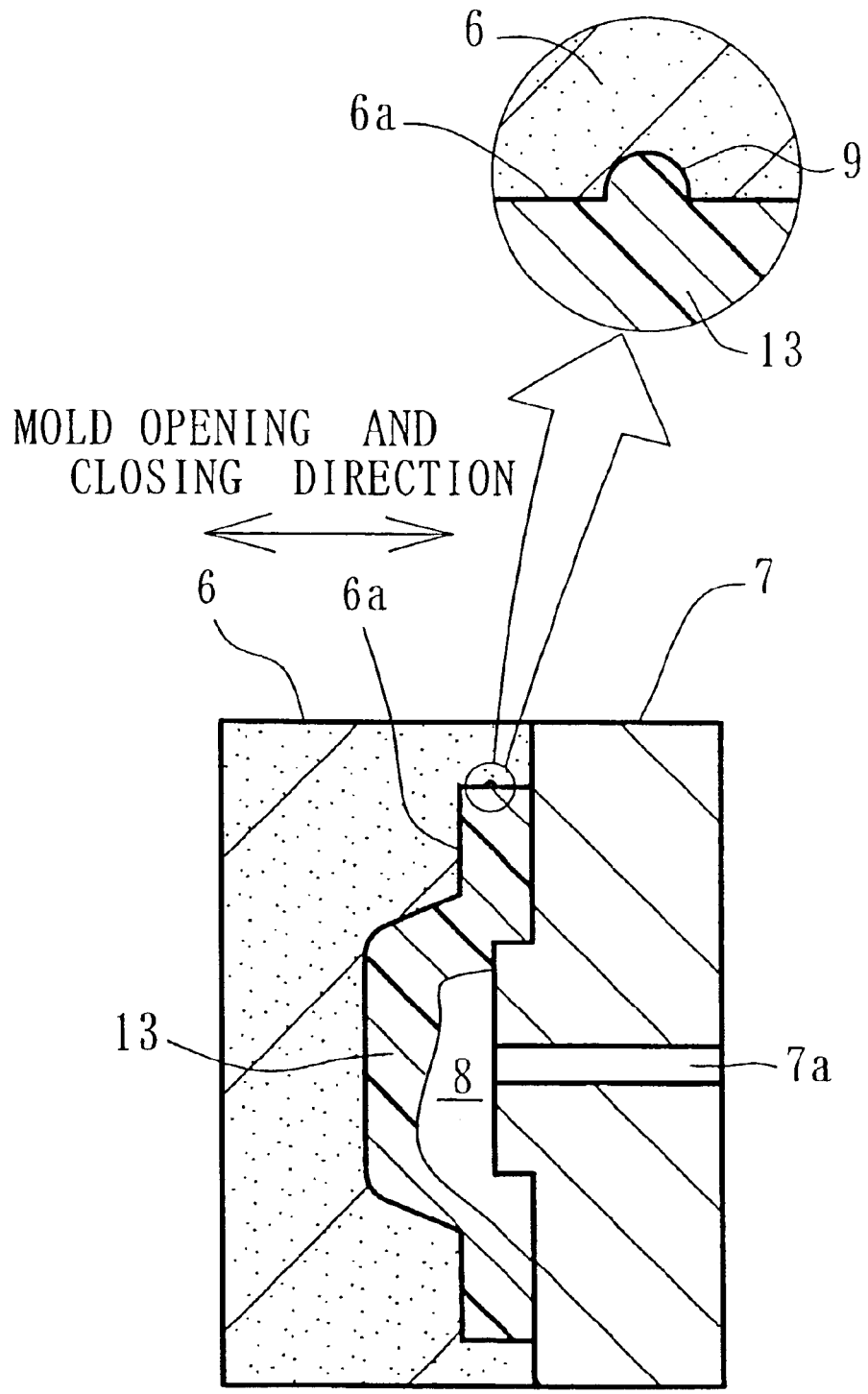
FIG. 3 is a cross-sectional view of an injection mold using a concrete form or mold.

One embodiment of the present invention will now be explained with reference to FIG. 1. The same reference numerals are used to the parts common to the conventional examples. FIG. 1 shows a method of manufacturing a female mold which is used as a movable mold 6 in FIG. 3. A frame 2 mounted on a master model 1 is integrally formed with a cylindrical concrete receiver 10 projecting upwardly from a top section 3 of the frame 2. The concrete receiver 10 communicates with the inside and outside of the frame 2. Sections of the frame 2 excluding the concrete receiver 10 form a body section 11 and are adapted to receive the concrete of the predetermined cubic volume corresponding to at least the cubic volume of the form or mold to be completed.

The frame 2 is made of a suitable material with relatively stiffness properties such as metal, resin or wood in a substantially vessel-shape. The frame 2 is widely opened on the master model 1 side and integrally formed with a concrete receiver 10 at the top section 3 thereof on the other side which communicates with the inside of the frame 2. The volume of the concrete receiver 10 can be freely set according to the pressure condition to the concrete 5 filled inside the frame 2. For example, it can be set to about φ 100×height 200 (mm) relative to the frame 2 in which the predetermined cubic volume of the concrete 5 to be filled into the body section 11 is about 90 lit. The top section 3 is also provided with a small vent hole 2a of about φ 0.5 mm~1 mm for mold venting in selected number and place.

The concrete receiver 10 is open at its upper section through which a heavy weight 12 is inserted as a pressure member. The weight 12 can also be optionally set according to necessary pressure condition, but in the present embodiment condition, a round bar made of iron of about φ 95×300 (mm) is used. In this case, the weight is about 16 kg. The weight 12 can be selected from any material, but it is desirable that the weight 12 be selected from various metals such as iron or mineral material such as stone.

Operation of the present embodiment will now be explained. In FIG. 1, a frame 2 is mounted on a master model 1 and concrete 5 is filled into the frame 2 through a concrete receiver 10 at normal pressure or at lower pressure than the subsequent forced pressure. In this case, the concrete 5 more than the predetermined cubic volume is filled into the frame 2 to cause part of the concrete 5 to be overflowed into the concrete receiver 10 from a body section 11. Then, a weight 12 is inserted through the upper section of the concrete receiver 10 to apply pressure to the concrete 5 overflowed from the body section 11.

In this manner, the concrete 5 within the body section 11 is caused to fully contact the surface of the master model 1 under pressure. After the concrete 5 hardens due to setting, the frame 2 is removed from the concrete 5 to obtain a concrete form or mold such as a movable mold 6 shown in FIG. 3.

In this case, the mold surface of the concrete form or mold is caused to be fine under pressure and improve the luster. Since the mold surface can also faithfully copy the shape of the master model, it is possible to reduce the time and cost necessary to correct the concrete form or mold after manufactured. Since sufficient quantity of the concrete can be filled into the frame, it is possible to prevent the inferior or improper filling of the concrete and improve durability of the form or mold.

The copied surface of the concrete form or mold is caused to be fine and smooth by forced pressure and the generation of pinholes on the mold surface of the concrete form or mold can also be reduced. Accordingly, it is possible to reduce inferior external appearance of the molded article resulting from the pinholes and make the mold opening operation smooth during injection molding. If a vibrator is used during application of forced pressure, filling of the concrete can be performed more finely and it is possible to further reduce the generation of pinholes.

Further, the concrete receiver 10 is provided on the body section 11 of the frame 2. Then, pressure is forcibly applied to the concrete 5 overflowed within the concrete receiver 10 by the weight 12 to set the filling quantity of the concrete 5 within the body section 11 at the predetermined cubic volume. Accordingly, it is possible to efficiently perform the forcible application of pressure in a simple construction.

Location and shape of the concrete receiver 10 can be optionally determined. The pressure member is not limited to the weight 12 using gravity, but pressure can be applied to the concrete by a pressure device such as a cylinder device. Accordingly, the concrete receiver 10 can be provided on the side of the frame 2 to apply pressure by the cylinder device. Further, if the entire top section 3 of the frame 2 can be vertically moved, it is also possible to perform forcible application of pressure to the concrete by applying pressure to the top section 3 itself.

What is claimed is:

1. A method of manufacturing e concrete form or mold, comprising:

providing a frame on a master model;

providing a concrete receiver on an upper portion of the frame;

filling concrete through the concrete receiver into the frame such that excess concrete overflows into the concrete receiver from the upper portion of the frame; and applying pressure to the overflowed concrete within the concrete receiver to compress the overflowed concrete into a predetermined volume within the frame thereby forming a concrete form or mold.

2. The method of manufacturing a concrete form or mold according to claim 1, further comprising:

providing an upper portion in the concrete receiver through which a pressure member is inserted to apply pressure to the overflowed concrete.

3. The method of manufacturing a concrete form or mold according to claim 1, including removing the frame to obtain the movable concrete form or mold after the concrete hardens.

4. The method of manufacturing a concrete form or mold according to claim 1, further comprising:

forming the frame integrally with the concrete receiver which projects upwards from the upper portion of the frame, wherein the concrete receiver communicates with the inside and outside of the frame.

5. The method of manufacturing a concrete form or mold according to claim 4, further comprising:

providing a vent hole in the upper portion of the frame for venting.

6. The method of manufacturing a concrete form or mold according to claim 4, wherein the upper portion of the frame is moved downward to apply pressure to the concrete within the frame.

* * * * *